United States Patent
Kikuchi (10) Patent No.: US 10,650,965 B2
(45) Date of Patent: May 12, 2020

(54) FILM CAPACITOR, COMBINATION TYPE CAPACITOR, AND INVERTER AND ELECTRIC VEHICLE USING THE SAME

(71) Applicant: KYOCERA Corporation, Kyoto-shi, Kyoto (JP)

(72) Inventor: Naoki Kikuchi, Kirishima (JP)

(73) Assignee: KYOCERA Corporation, Kyoto-Shi, Kyoto (JP)

( * ) Notice: Subject to any disclaimer, the term of this patent is extended or adjusted under 35 U.S.C. 154(b) by 0 days.

(21) Appl. No.: 16/095,578

(22) PCT Filed: Apr. 26, 2017

(86) PCT No.: PCT/JP2017/016583
§ 371 (c)(1),
(2) Date: Oct. 22, 2018

(87) PCT Pub. No.: WO2017/188327
PCT Pub. Date: Nov. 2, 2017

(65) Prior Publication Data
US 2019/0115152 A1   Apr. 18, 2019

(30) Foreign Application Priority Data
Apr. 27, 2016   (JP) .................. 2016-089438

(51) Int. Cl.
*H01G 4/32*   (2006.01)
*H01G 2/04*   (2006.01)
(Continued)

(52) U.S. Cl.
CPC ............... *H01G 2/04* (2013.01); *H01G 4/005* (2013.01); *H01G 4/012* (2013.01); *H01G 4/015* (2013.01);
(Continued)

(58) Field of Classification Search
CPC .. H01G 4/32; H01G 4/05; H01G 4/06; H01G 4/008; H01G 4/012; H01G 4/30; H01G 4/38; H01G 4/12
See application file for complete search history.

(56) References Cited

U.S. PATENT DOCUMENTS

2006/0050467 A1* 3/2006 Shiota ...................... H01G 2/16
361/303
2008/0259522 A1* 10/2008 Okuno ..................... H01G 2/08
361/273
(Continued)

FOREIGN PATENT DOCUMENTS

CN   201789431 U   4/2011
GB   2298962 A     9/1996
(Continued)

*Primary Examiner* — Nguyen T Ha
(74) *Attorney, Agent, or Firm* — Volpe and Koenig, P.C.

(57) ABSTRACT

A film capacitor includes a main body portion including a dielectric film and a metal film; and external electrodes, and the external electrodes are disposed at a pair of main body ends in a first direction of the main body portion, respectively. The metal film includes a first portion connected to one of the external electrodes which is disposed at one of the main body ends, a second portion disposed at the other main body end, and a third portion disposed between the first portion and the second portion in the first direction, and a film thickness of the third portion is smaller than a film thickness of the second portion.

10 Claims, 9 Drawing Sheets

(51) Int. Cl.
*H01G 4/18* (2006.01)
*H02M 7/48* (2007.01)
*H01G 4/015* (2006.01)
*H01G 4/38* (2006.01)
*H01G 4/012* (2006.01)
*H01G 4/005* (2006.01)
*H01G 4/14* (2006.01)
*H01G 4/228* (2006.01)

(52) U.S. Cl.
CPC .............. *H01G 4/145* (2013.01); *H01G 4/18* (2013.01); *H01G 4/228* (2013.01); *H01G 4/32* (2013.01); *H01G 4/38* (2013.01); *H02M 7/48* (2013.01)

(56) References Cited

U.S. PATENT DOCUMENTS

| | | | | |
|---|---|---|---|---|
| 2008/0278888 | A1* | 11/2008 | Yang | H01G 2/16 361/323 |
| 2009/0225491 | A1* | 9/2009 | Yao | H01G 4/012 361/303 |
| 2012/0002346 | A1* | 1/2012 | Takagaki | H01G 4/012 361/301.4 |
| 2013/0293192 | A1* | 11/2013 | Abe | B60L 11/182 320/108 |
| 2014/0036405 | A1* | 2/2014 | Takeoka | H01G 4/005 361/273 |
| 2014/0376154 | A1* | 12/2014 | Takeoka | H01G 4/015 361/301.4 |

FOREIGN PATENT DOCUMENTS

| | | | |
|---|---|---|---|
| JP | 08-045775 A | 2/1996 | |
| JP | 408045775 | * 2/1996 | ............... H01G 4/32 |
| JP | 3392525 B2 | 3/2003 | |
| JP | 2004-134561 A | 4/2004 | |
| JP | 2008-277562 A | 11/2008 | |
| JP | 2009-049139 A | 3/2009 | |
| JP | 2009-164328 A | 7/2009 | |
| JP | 2013-021002 A | 1/2013 | |

* cited by examiner

FILM CAPACITOR, COMBINATION TYPE CAPACITOR, AND INVERTER AND ELECTRIC VEHICLE USING THE SAME

TECHNICAL FIELD

The present disclosure relates to a film capacitor, combination type capacitor, and an inverter and an electric vehicle using the same.

BACKGROUND ART

The film capacitor has, for example, a dielectric film obtained by forming a polypropylene resin into a film, and a metal film formed on a surface of the dielectric film by vapor deposition. The metal film is used as an electrode. With such a configuration, the film capacitor has an advantage that even when short-circuiting occurs in an insulation defect portion of the dielectric film, the metal film around the defect portion evaporates and scatters due to a short circuit energy, and the insulation defect portion is insulated, so that dielectric breakdown of the film capacitor can be prevented (self-recovery property).

In this manner, the film capacitor can prevent ignition and electric shock when an electric circuit is short-circuited. Focusing on this point, recently, the film capacitor has been applied to a power supply circuit such as LED (Light Emitting Diode) lighting and the like, and applications are expanding to motor drive of hybrid cars, an inverter system for solar power generation, and the like.

In the film capacitor, when the self-recovery property functions as described above, the metal film around the insulation defect portion evaporates and scatters for insulation. As a result, an area of the electrode for generating electrostatic capacitance is reduced and a capacitance of the film capacitor is reduced. In order to suppress reduction in capacitance after self-recovery, a film capacitor in which a deposition electrode in the vicinity of an insulation margin portion is divided into a plurality of small regions and these regions are connected in parallel by fuses is disclosed (see, for example, Patent Literature 1). In the film capacitor having such a structure, when the self-recovery property functions, the fuse is blown and the region having the defect portion can be separated from the electric circuit.

CITATION LIST

Patent Literature

Patent Literature 1: Japanese Unexamined Patent Publication JP-A 2009-164328

SUMMARY OF INVENTION

A film capacitor of the present disclosure includes: a main body portion including a dielectric film and a metal film; and external electrodes, the external electrodes being disposed at a pair of main body ends which are both ends in a first direction of the main body portion, respectively. The metal film includes a first portion connected to an external electrode of the external electrodes which is disposed at one of the main body ends, a second portion disposed at the other main body end, and a third portion disposed between the first portion and the second portion in the first direction. A film thickness of the third portion is smaller than a film thickness of the second portion.

A combination type capacitor of the present disclosure includes a plurality of film capacitors and at least one bus bar connecting all of the plurality of film capacitors, the plurality of film capacitors including the above-described film capacitor.

An inverter of the present disclosure includes a bridge circuit including switching elements and a capacitance member connected to the bridge circuit, the capacitance member including the above-described film capacitor or the above-described combination type capacitor.

An electric vehicle of the present disclosure includes a power supply, an inverter connected to the power supply, a motor connected to the inverter, and a wheel driven by the motor, the inverter including the above-described inverter.

DESCRIPTION OF EMBODIMENTS

Figure 1:
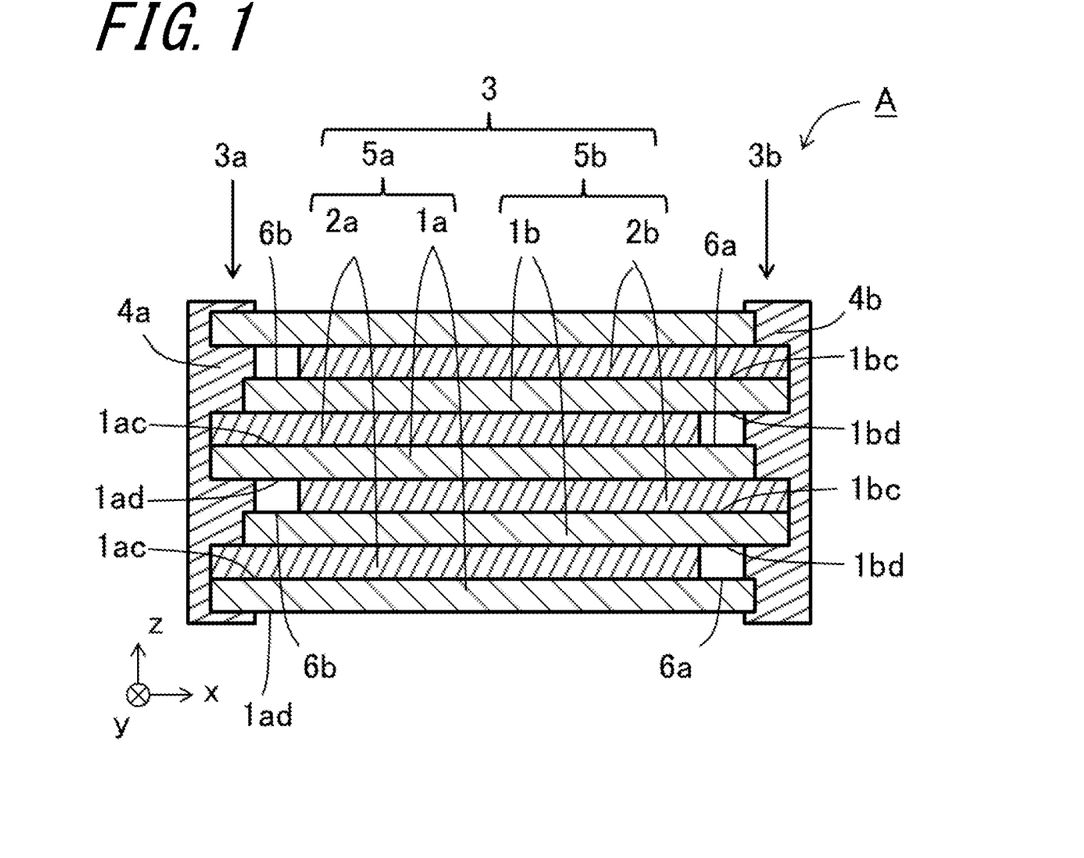
FIG. 1 is a schematic cross-sectional view of a laminated type film capacitor.
Figure 2:
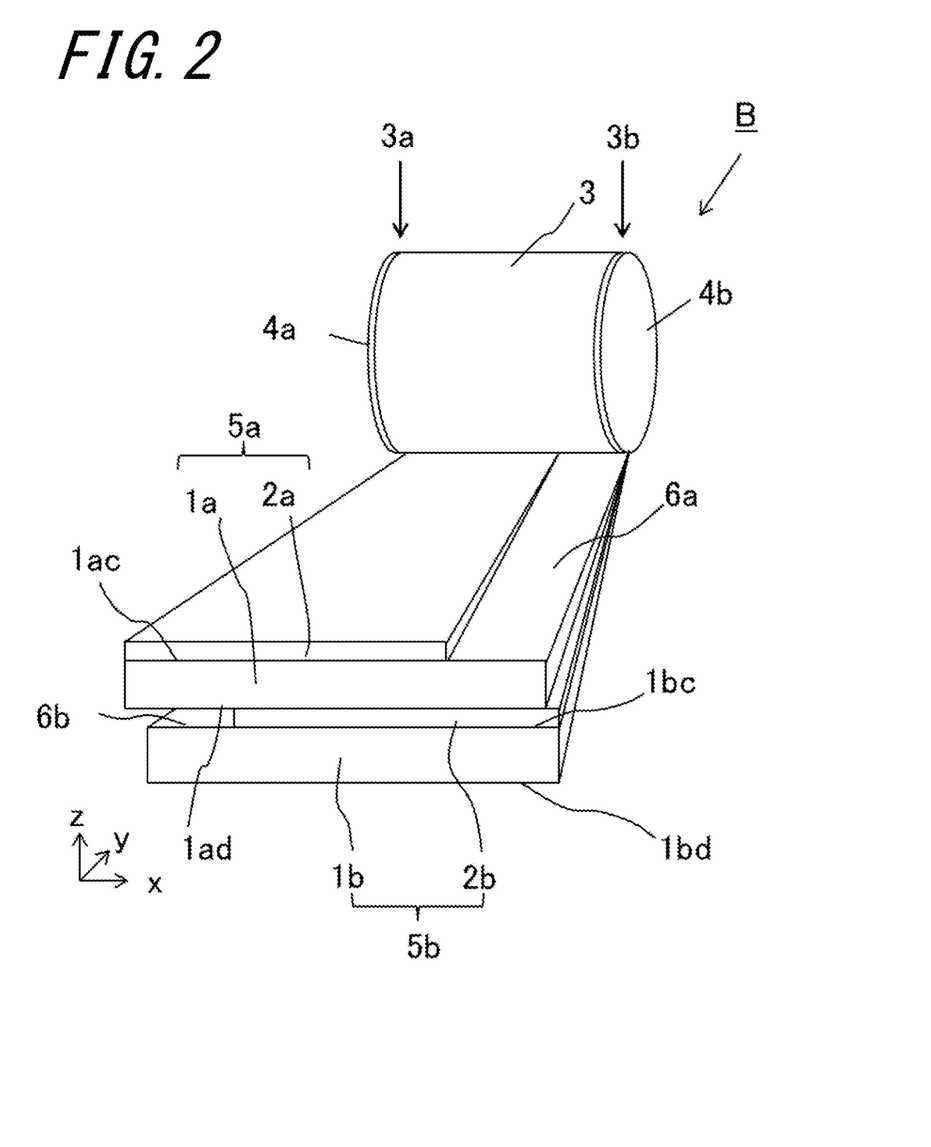
FIG. 2 is an exploded perspective view schematically showing a structure of a wound type film capacitor.

As shown in FIGS. 1 and 2, the film capacitor includes a film capacitor main body portion 3 (hereinafter also referred to simply as a main body portion 3) in which dielectric films 1a, 1b and metal films 2a, 2b are laminated or wound, and a pair of external electrodes 4a and 4b provided at opposing ends (main body ends) of the main body portion 3 by metal spraying.

In the main body portion 3 of a laminated type film capacitor A shown in FIG. 1, a metal film-attached film 5a provided with a metal film 2a on a first surface 1ac of a dielectric film 1a, and a metal film-attached film 5b provided with a metal film 2b on a first surface 1bc of a dielectric film 1b are alternately laminated. The metal film 2a is electrically connected to the external electrode 4a at one main body end 3a of the main body portion 3. The metal film 2b is electrically connected to the external electrode 4b at the other main body end 3b of the main body portion 3.

In FIG. 1, a width direction of the dielectric films 1a and 1b and the metal films 2a and 2b is indicated as an x direction, a length direction thereof is indicated as a y direction, and a thickness direction thereof is indicated as a z direction. Therefore, the dielectric films 1a and 1b and the metal films 2a and 2b are overlapped in the z direction, and the external electrodes 4a and 4b are disposed at the main body ends 3a and 3b located in the x direction of the main body portion 3, respectively.

In the main body portion 3 of a wound type film capacitor B shown in FIG. 2, the metal film-attached film 5a provided with the metal film 2a on the first surface 1ac of the dielectric film 1a, and the metal film-attached film 5b provided with the metal film 2b on the first surface 1bc of the dielectric film 1b are laminated and then wound. The metal film 2a is electrically connected to the external electrode 4a at the one main body end 3a of the main body portion 3. The metal film 2b is electrically connected to the external electrode 4b at the other main body end 3b of the main body portion 3.

In FIG. 2, in order to facilitate understanding, thicknesses of the dielectric films 1a and 1b and the metal films 2a and 2b which are drawn out are drawn to be thicker as they go forward in the drawing sheet.

In FIG. 2, the width direction of the dielectric films 1a and 1b and the metal films 2a and 2b is indicated as the x direction, the length direction thereof is indicated as the y direction, and the thickness direction thereof is indicated as the z direction. Therefore, the dielectric films 1a and 1b and the metal films 2a and 2b are laminated in the z direction, and the external electrodes 4a and 4b are disposed at the main body ends 3a and 3b located in the x direction of the main body portion 3, respectively. In the film capacitor B, the x direction is the same as an axial direction of winding.

The dielectric film 1a of the film capacitors A and B has the first surface 1ac and the second surface 1ad which are opposed to each other, and the dielectric film 1b thereof has the first surface 1bc and the second surface 1bd which are opposed to each other. The metal film-attached film 5a is a film in which the metal film 2a is formed on the first surface 1ac of the dielectric film 1a, and has a so-called insulation margin portion 6a in which the dielectric film 1a is exposed on a part of the first surface 1ac. The metal film-attached film 5b is a film in which the metal film 2b is formed on the first surface 1bc of the dielectric film 1b, and has a so-called insulation margin portion 6b in which the dielectric film 1b is exposed on a part of the first surface 1bc. As shown in FIGS. 1 and 2, these metal film-attached films 5a and 5b are laminated or wound in a state slightly shifted in the width direction (x direction).

In this manner, in the film capacitors A and B, the metal film-attached film 5a including the dielectric film 1a and the metal film 2a and the metal film-attached film 5b including the dielectric film 1b and the metal film 2b are overlapped and laminated or wound as shown in FIGS. 1 and 2.

The metal films 2a and 2b are connected to the external electrodes 4a and 4b, respectively, at connecting portions exposed at the main body ends 3a and 3b located in the x direction of the main body portion 3.

Figure 3A:
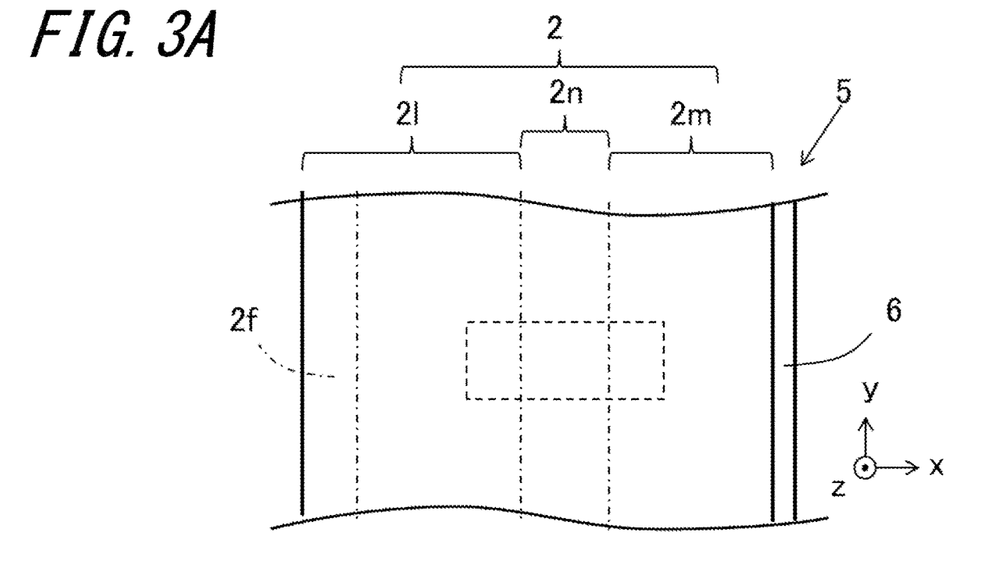
FIG. 3A is a plan view of a surface showing a part of a dielectric film and a metal film.

In order to explain features of the present embodiment common to the metal film-attached films 5a and 5b, in the following, reference numerals a and b may be omitted as shown in FIG. 3A. Further, in a transverse cross-sectional view of FIG. 3B, the thickness direction (z direction) of the film is enlarged in order to facilitate understanding.

Figure 3B:
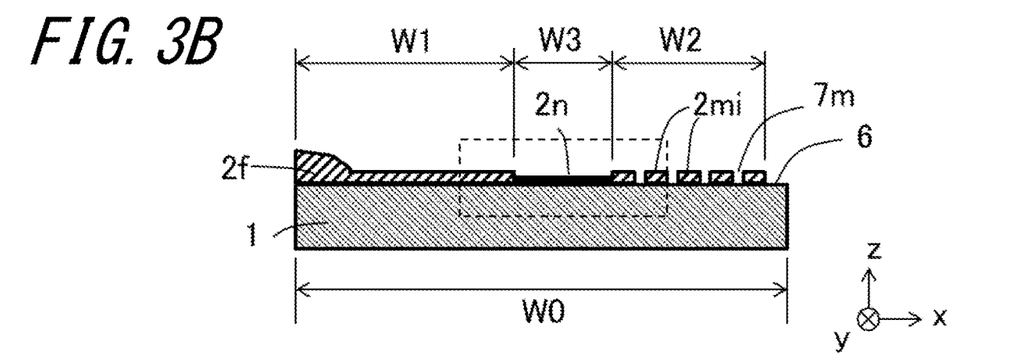
FIG. 3B is a transverse cross-sectional view showing a part of the dielectric film and the metal film.

In the present embodiment, as shown in FIGS. 3A and 3B, the metal film 2 includes a first portion 21, a second portion 2m, and a third portion 2n. The first portion 21 is located on a left main body end side and is connected to an external electrode 4 (not shown). The second portion 2m is located in the vicinity of a right main body end, that is, in the vicinity of the insulation margin portion 6, and is not directly connected to the external electrode 4 (not shown). The third portion 2n is located between the first portion 21 and the second portion 2m in the x direction. In the metal film 2, the first portion 21 and the second portion 2 m are disposed at both ends in the x direction, respectively, and the third portion 2n is sandwiched between the first portion 21 and the second portion 2m.

The first portion 21 and the third portion 2n are continuous metal films. Since the first portion 21 is a continuous film and connected to the external electrode 4, an ESR is reduced.

Figure 4A:
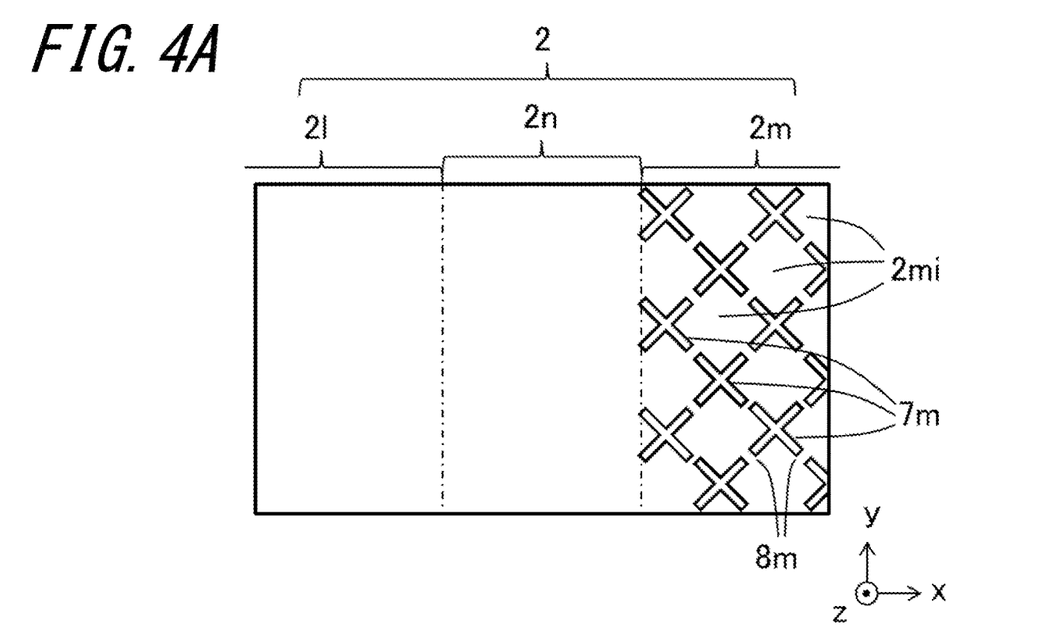
FIG. 4A is an enlarged plan view of a part (broken line portion) of FIG. 3A.

FIG. 3B is a transverse cross-sectional view of FIG. 3A, and FIG. 4A is an enlarged plan view of a broken line portion of FIG. 3A. As shown in FIGS. 3B and 4A, the second portion 2m may comprise a plurality of small regions 2mi and a fuse portion 8m connecting the small regions 2mi. The plurality of small regions 2mi are separated by intermittent mesh-like (lattice-like) grooves 7m. The adjacent small regions 2mi are electrically connected to each other by the fuse portion 8m. The small region 2mi and the fuse portion 8m can be formed by, for example, laser processing. A width of the groove 7m may be, for example, 0.01 to 0.20 mm.

In this way, since the second portion 2m has the small regions 2mi and the small regions 2mi are connected by the fuse portion 8m, it is possible to separate an insulation defect portion from an electric circuit by fusing the fuse portion 8m around the insulation defect portion by a short-circuit current at the time of self-recovery. Therefore, film capacitors A and B having an excellent self-recoverability can be obtained. In addition, there is an advantage that components evaporated by self-recovery tend to be evaporated to the outside through the mesh-like (lattice-like) grooves 7m.

It is sufficient that the second portion 2m has the plurality of small regions 2mi and the fuse portion 8m connecting the small regions 2mi, and the groove 7m may not be mesh-like (lattice-like). For example, the second portion 2m may have band-like (horizontal striped) small regions 2mi extending in the x direction, which are divided by the grooves 7m extending in the x direction.

Figure 5:
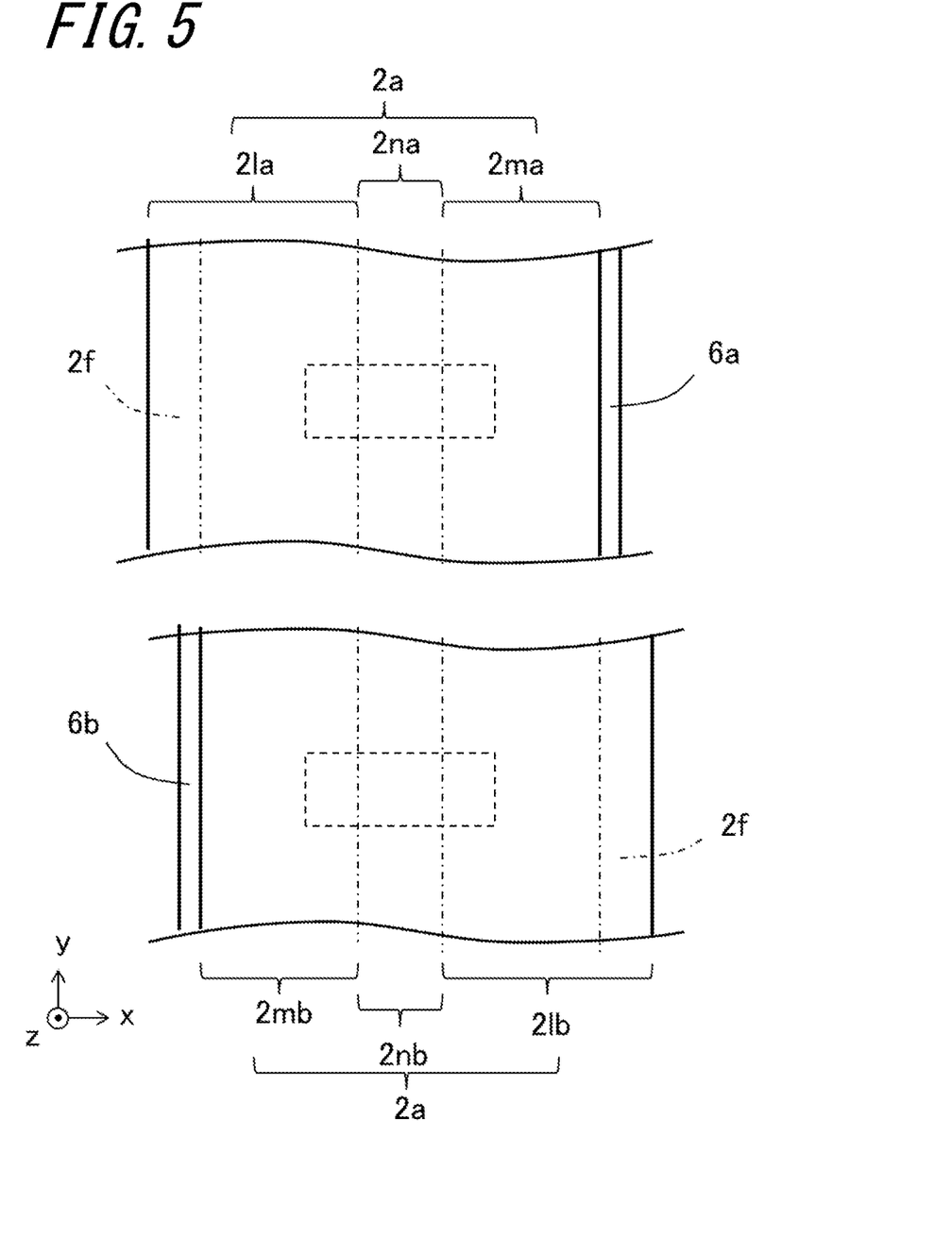
FIG. 5 shows an arrangement in which a pair of metal film-attached films are overlapped, wherein an upper part is a plan view of one metal film-attached film and a lower part is a plan view of the other metal film-attached film.
Figure 6:
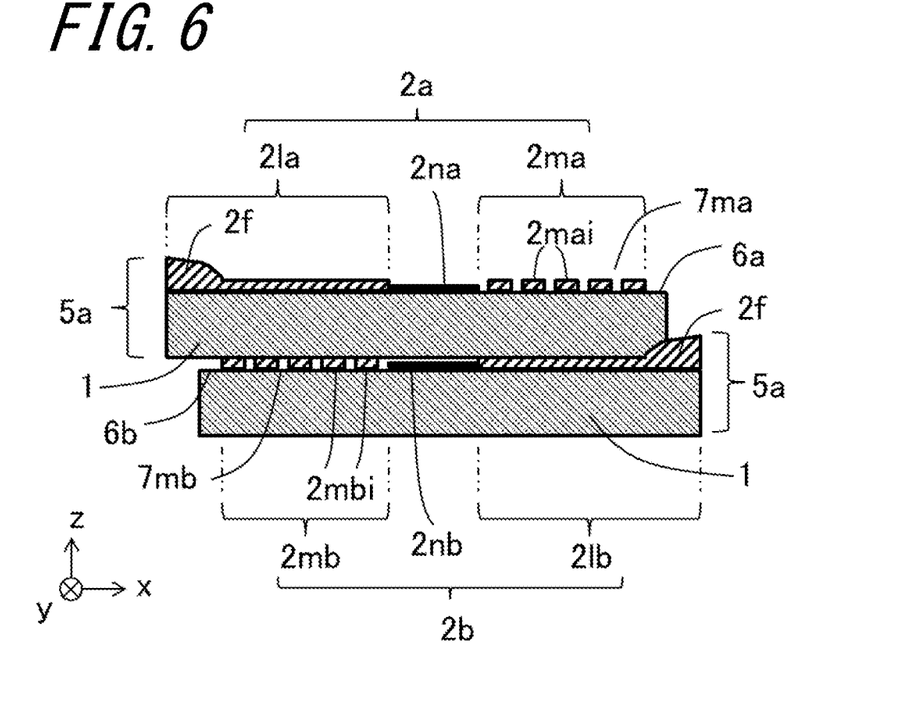
FIG. 6 is a transverse cross-sectional view showing a laminated structure of the dielectric film and the metal film.
Figure 7:
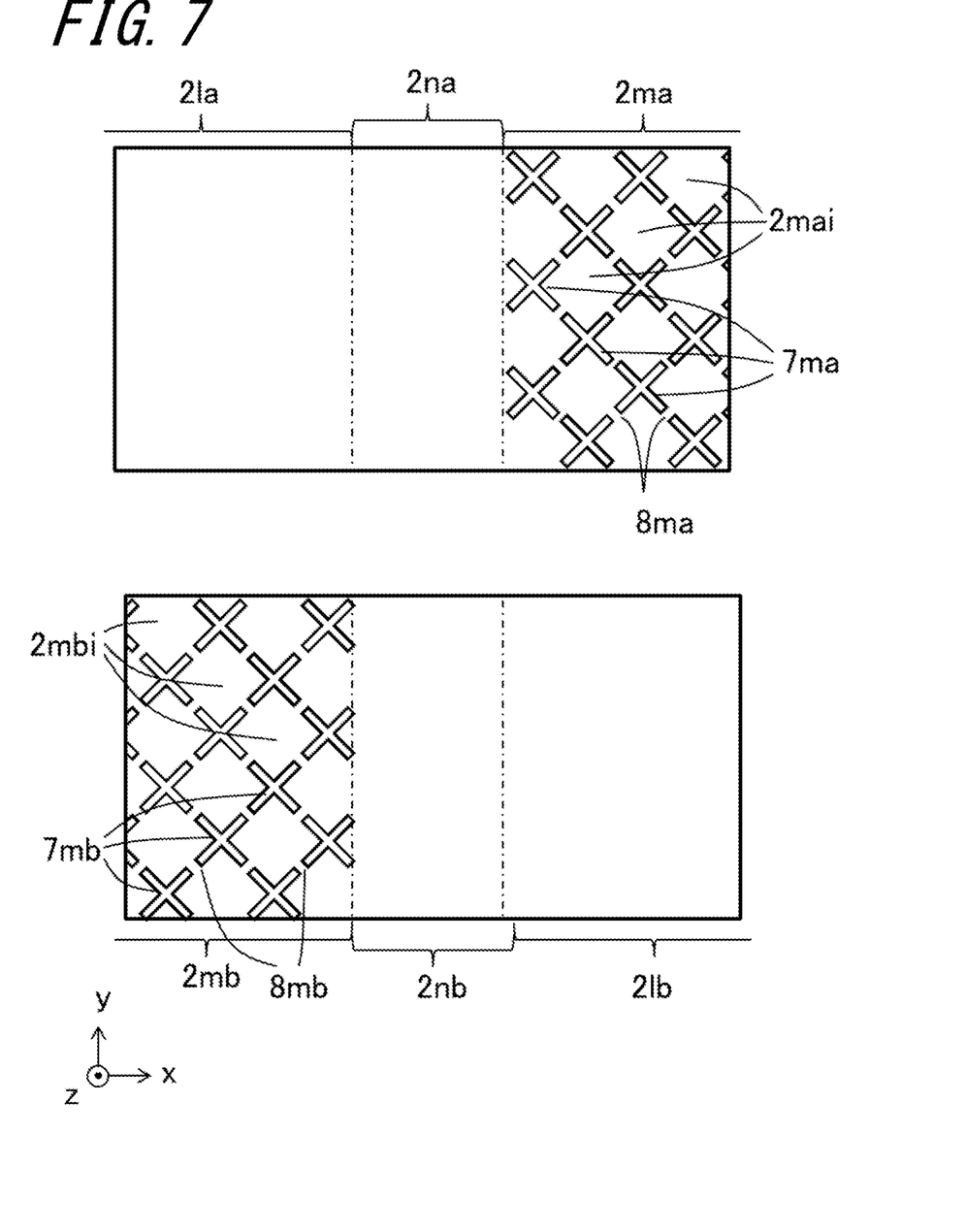
FIG. 7 is an enlarged view of a part (broken line portion) of FIG. 5, wherein an upper part is an enlarged plan view of a part of the upper part of FIG. 5 and a lower part is an enlarged plan view of a part of the lower part of FIG. 5.

FIGS. 5 to 7 show an arrangement in which the metal film-attached films 5a and 5b are overlapped. The metal film-attached film 5a shown in the upper part of FIG. 5 and the metal film-attached film 5b shown in the lower part of FIG. 5 are overlapped with each other slightly shifted in the width direction (x direction) as shown in the transverse cross-sectional view of FIG. 6. The upper part of FIG. 7 is an enlarged view of the broken line portion of the upper part of FIG. 5, and the lower part of FIG. 7 is an enlarged view of the broken line portion of the lower part of FIG. 5. The metal film-attached films 5a and 5b are disposed so that a first portion 21a of the metal film 2a overlaps a second portion 2mb of the metal film 2b, and a second portion 2ma of the metal film 2a overlaps a first portion 21b of the metal film 2b.

A third portion 2na of the metal film 2a and a third portion 2nb of the metal film 2b are disposed to overlap each other. The third portion 2na of the metal film 2a may partially overlap the second portion 2mb or the first portion 21b of the metal film 2b. The third portion 2nb of the metal film 2b may partially overlap the second portion 2ma or the first portion 21a of the metal film 2a.

In the present embodiment, since the third portion 2n is disposed between the first portion 21 and the second portion $2m$, when the metal film-attached films $5a$ and $5b$ overlap each other, the second portion $2ma$ of the metal film $2a$ and the second portion $2mb$ of the metal film $2b$ do not overlap each other. Therefore, as shown in FIG. 6, a fuse portion $8ma$ of the second portion $2ma$ and a fuse portion $8mb$ of the second portion $2mb$ do not overlap each other. In other words, since the fuse portions $8m$ do not concentrate in a central portion in the x direction of the film capacitors A and B, concentration of heat generation is suppressed, and it is possible to suppress dielectric breakdown at the central portion in the x direction of the film capacitors A and B.

Figure 4B:
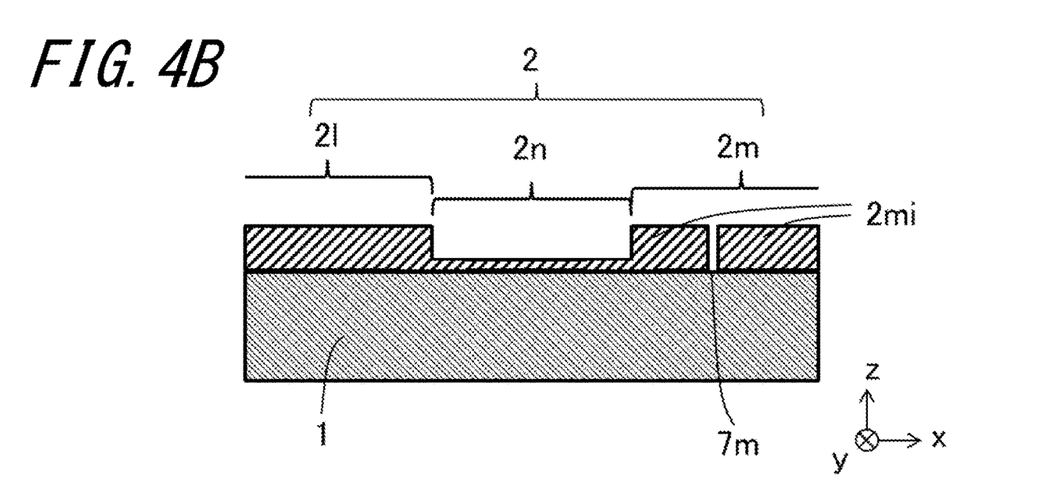
FIG. 4B is an enlarged transverse cross-sectional view of a part (broken line portion) of FIG. 3B.

As shown in FIGS. 3B and 4B, the first portion 21 and the third portion $2n$ of the metal film 2 are continuous at a boundary between the first portion 21 and the third portion $2n$. Further, the small region $2mi$ adjacent to the third portion $2n$ of the metal film 2 is continuous with the third portion $2n$ at a boundary between the second portion $2m$ and the third portion $2n$. Therefore, in the present embodiment, the grooves and the fuses are not concentratedly disposed in the vicinity of the boundary between the first portion 21 and the third portion $2n$ and the boundary between the second portion $2m$ and the third portion $2n$. That is, since the fuses do not concentrate even in the vicinity of the boundary between the first portion 21 and the third portion $2n$ and the boundary between the second portion $2m$ and the third portion $2n$, it is possible to suppress the concentration of heat generation in this region, thereby suppressing the dielectric breakdown. In addition, it is possible to suppress occurrence of wrinkles due to concentration of the grooves at a specific location during lamination or winding.

As described above, in the second portion $2m$ having the small regions $2mi$ and the fuse portions $8m$, when a self-recovery phenomenon occurs in the insulation defect portion, the short-circuit current flows in the fuse portion $8m$ around the insulation defect portion, and the fuse portion $8m$ generates heat and is fused, so that the insulation defect portion can be separated from the electric circuit. This is because a width of the fuse portion $8m$ is narrow and an electrical resistance is high. In the conventional film capacitor, there are portions where the fuse portions $8ma$ and $8mb$ overlap each other near the center in the x direction, that is, portions where the fuse portions $8m$ concentrate over a plurality of layers (winding layers), and when the fuse portions $8m$ generate heat and are fused in a part of the layers (winding layers), the fuse portions $8m$ in the other layers (winding layers) are also fused by the heat, and a capacitance has been greatly reduced.

On the other hand, in the present embodiment, the third portion $2n$ is disposed between the first portion 21 and the second portion $2m$. The third portion $2n$ does not have the fuse portion $8m$ but has a smaller film thickness than the second portion $2m$. In general, the same metallic material is used for the metal film 2 regardless of portion. Therefore, a sheet resistance of the metal film 2 changes by adjusting the film thickness of the metal film 2. In other words, the third portion $2n$ having a small film thickness of the metal film 2 can be the portion having a high sheet resistance.

Therefore, in the third portion $2n$, that is, in the portion where the film thickness is small of the metal film 2, the metal film 2 evaporates and scatters with a smaller amount of heat than the other portion (fuse portion $8m$). Therefore, in the third portion $2n$, even when the self-recovery occurs, the heat generation is suppressed to a smaller level than when the fuse portion $8m$ is fused. Further, since the metal film 2 is continuous without being divided at the third portion $2n$, the generated heat easily diffuses in a plane of the metal film 2. Therefore, the diffusion of heat to the metal film 2 in the other layer (wound layer) is suppressed and an influence of evaporation/scattering of the metal film 2 does not reach the other layer (wound layer), and thus it is possible to reduce reduction in capacitance of the film capacitors A and B.

That is, by placing the third portion $2n$ having a high electrical resistance (sheet resistance) between the first portion 21 and the second portion $2m$, it is possible to suppress the concentration of heat generation due to concentration of the fuse portions $8m$ while maintaining the self-recoverability of the film capacitors A and B, and to reduce a possibility that the fuse portions $8m$ are blown at the same time over the plurality of layers (winding layers), thereby reducing reduction in capacitance at the time of self-recovery.

In this way, since the film thickness of the third portion $2n$ located between the first portion 21 and the second portion $2m$ located at both ends in the x direction is small (has a high sheet resistance), in the present embodiment, it is possible to maintain the self-recoverability (withstand voltage) even in a region in which the third portions $2n$ ($2na$ and $2nb$) of the film capacitors A and B overlap each other. In other words, since the third portion $2n$ having a small film thickness is disposed at a portion (near the center in the width direction (x direction)) in which the fuse portion $8m$ does not exist when the metal film-attached films $5a$ and $5b$ are overlapped with each other, when the insulation defect occurs in the metal film $2na$ or $2nb$, the metal films $2na$ and $2nb$ in the insulation defect portion tend to evaporate and scatter, and it is possible to develop self-recoverability.

Even when the second portion $2m$ is not divided into the plurality of small regions $2mi$ by the groove $7m$, that is, the second portion $2m$ is the continuous metal film, since the third portion $2n$ having a high resistance is sandwiched between the first portion 21 and the second portion $2m$, when the insulation defect occurs in the vicinity of the center in the x direction of the film capacitors A and B, the metal films $2na$ and $2nb$ of the insulation defect portion tend to evaporate and scatter. Further, since the thickness of the third portion $2n$ is small, a gap is formed between the metal film-attached films $5a$ and $5b$ in the third portion $2n$. Therefore, the evaporated and scattered metal components are likely to escape to the outside through the gap, resulting in the film capacitors A and B having a good self-recovery function.

As shown in FIG. 3B, the length of the dielectric film 1 in the x direction is defined as W0, the length of the first portion in the x direction is defined as W1, the length of the second portion in the x direction is defined as W2, and the length of the third portion in the x direction is defined as W3. A sum (W1+W3) of W1 and W3 is preferably larger than W2. Since (W1+W3) is made larger than W2, even when the metal film-attached films $5a$ and $5b$ overlap each other, a region in which the second portions $2m$ ($2ma$ and $2mb$) overlap each other is not formed, and the fuse portions $8m$ do not concentrate.

W2 is preferably larger than W1. By setting W2 to be larger than W1, the film capacitors A and B having an excellent self-recoverability can be obtained.

The length of W3 may be 0.2 to 0.5 as a ratio of W3 to W0 (W3/W0). By setting W3/W0 equal to or more than 0.2, it is possible to dispose the fuse portions $8m$ of the second portion $2m$ do not overlap each other in the vicinity of the center in the x direction, thereby obtaining a sufficient effect of preventing the heat generation. Further, by setting it to 0.5 or less, even when the self-recovery occurs at the third portion $2n$, it is possible to suppress reduction in capacitance of the film capacitors A and B.

As shown in FIG. 3B and FIG. 6, the metal films 2 (2a, 2b) may have a heavy edge structure in the vicinity (2f) of the connection portions with the external electrodes 4 (4a, 4b). Hereinafter, the vicinity 2f of the connecting portion of the metal film 2 to the external electrode 4 may also be referred to as a heavy edge portion 2f. The heavy edge structure is a structure in which the resistance of the metal film 2 in the vicinity 2f of the connection portion with the external electrode 4 is reduced with respect to an effective region in which the metal films 2a and 2b overlap each other.

The film thickness of the metal film 2 is preferably, for example, 20 nm or less, particularly 5 to 15 nm in the first portion 21 and the second portion 2m. By setting the first portion 21 and the second portion 2m of the metal film 2 to such a film thickness, an area resistance (the sheet resistance) is 18 to 50 Ω/square and the self-recoverability can be obtained. Further, the film thickness of the metal film 2 in the vicinity 2f of the connection portion with the external electrode 4 is preferably set to be 2 to 4 times the first portion 21 and the second portion 2m, that is, in a range of 10 to 80 nm. The thickness of the first portion 21 may be larger than the thickness of the second portion 2m. By setting the film thickness of the first portion 21 connected to the external electrode 4 to be larger than the film thickness of the second portion 2m, the equivalent series resistance (ESR) of the film capacitors A and B can be reduced.

The thickness of the metal film 2 at the third portion 2n may be, for example, 0.2 to 0.6 times the film thickness of the first portion 21 and the second portion 2m. By setting the film thickness to such a thickness, the sheet resistance can be increased more than that of the second portion 2m, and even when the insulation defect occurs in the third portion 2n, the self-recoverability can be sufficiently obtained with a small amount of heat. The film thickness of the metal film 2 may be confirmed, for example, by using a scanning electron microscope (SEM) or the like for a cross-section of the metal film-attached film 5 processed by ion milling.

Examples of insulating resin materials used for the dielectric film 1 include polypropylene (PP), polyethylene terephthalate (PET), polyphenylene sulfide (PPS), polyethylene naphthalate (PEN), polyarylate (PAR), polyphenylene ether (PPE), polyetherimide (PEI) and cycloolefin polymer (COP). In particular, the polyarylate (PAR) has a high breakdown voltage.

Such film capacitors A and B may be produced, for example, as follows. First, the dielectric film 1 is prepared. The dielectric film 1 is obtained, for example, by forming a resin solution in which an insulating resin is dissolved in a solvent, into a sheet shape on a surface of a base material formed of polyethylene terephthalate (PET), and by drying it to volatilize the solvent. A forming method may be appropriately selected from well-known film forming methods such as a doctor blade method, a die coater method and a knife coater method. As the solvent used for forming, for example, methanol, isopropanol, n-butanol, ethylene glycol, ethylene glycol monopropyl ether, methyl ethyl ketone, methyl isobutyl ketone, xylene, propylene glycol monomethyl ether, propylene glycol monomethyl ether acetate, dimethylacetamide, cyclohexane, or an organic solvent containing a mixture of two or more selected from them is preferably used. Further, a resin film produced by a melt extrusion method may be stretched.

The thickness of the dielectric film 1 may be, for example, 5 μm or less, however, it is particularly preferable to use the dielectric film 1 having a thickness of 0.5 to 4 μm.

The dielectric film 1 may be composed of only the insulating resin described above, but may contain other materials. Examples of constituent elements other than the resin contained in the dielectric film 1 include the above-described organic solvents and inorganic fillers. As the inorganic filler, for example, inorganic oxides such as alumina, titanium oxide, silicon dioxide, inorganic nitrides such as silicon nitride, glass or the like can be used. Particularly when a material having a high relative permittivity, such as a complex oxide having a perovskite structure, is used as the inorganic filler, the relative permittivity of the entire dielectric film 1 can be improved and the film capacitor can be downsized. In order to improve compatibility between the inorganic filler and the resin, surface treatment such as silane coupling treatment or titanate coupling treatment may be performed on the inorganic filler.

When such an inorganic filler is used for the dielectric film 1, by producing the composite film containing less than 50 mass % of the inorganic filler and 50 mass % or more of the resin, it is possible to obtain effects such as improvement of the relative permittivity by the inorganic filler while maintaining flexibility of the resin. Further, a size (an average particle diameter) of the inorganic filler is preferably 4 to 1000 nm.

One of ends in the width direction (x direction) of one surface of the produced dielectric film 1 is masked. By vapor depositing a metal component such as aluminum (Al) on an unmasked portion of the one surface of the dielectric film 1 to form the metal film 2, the metal film-attached film 5 having the insulation margin portion 6 is obtained.

When forming the metal film 2 having the first portion 21, the second portion 2m and the third portion 2n, for example, when forming the metal film 2 on the dielectric film 1, it may be formed by the following procedure. A region in which the third portion 2n of the metal film 2 is to be formed on the one surface of the dielectric film 1 is applied with oil, to be masked (oil mask). First vapor deposition is performed on the oil-masked dielectric film 1 using a resistance heating vacuum vapor deposition apparatus. At this time, a vapor deposition film to be the first portion 21 and the second portion 2m is formed, and the oil mask applied to a portion to be the third portion 2n is volatilized. Thereafter, a second vapor deposition is further performed, so that the vapor deposition film is also formed in a region where the oil mask is volatilized. The obtained metal film-attached film 5 has a vapor deposition film to be the second portion 2m on one side (on the insulation margin portion 6 side) of the ends in the width direction (x direction), and has the first portion 21 on the other side, with the third portion 2n having a small film thickness of the metal film 2 interposed therebetween.

When forming the heavy edge structure, a portion other than a portion forming the heavy edge of the above-described metal film-attached film 5 is masked, and for example, zinc (Zn) is further formed by vapor deposition (third vapor deposition) on a mask-free portion of the above-described vapor deposited metal components (first and second vapor deposition films). The film thickness of the vapor deposition film for the third vapor deposition to form the heavy edge portion 2f is set to 1 to 3 times the film thickness of the above-described vapor deposited metal components (first and second vapor deposition films). Thus, the film thickness of the heavy edge portion 2f is 2 to 4 times the film thickness of the other first portion 21 and the second portion 2m (the sum of the film thicknesses of the vapor deposition films formed by the first vapor deposition and the second vapor deposition).

Next, the groove 7m is formed in a portion to be the second portion 2m of the metal film 2. A laser marker or a laser trimmer capable of blowing off a metal evaporated film is used for forming the groove 7m. One of green laser, YAG laser and CO₂ laser may be used as a laser.

As shown in FIGS. 1 and 2, the metal film-attached films (5a, 5b) having the metal film 2 (2a, 2b) on one surface thereof are overlapped or wound with each other as a set slightly shifted in the width direction (x direction) to obtain the main body portion 3.

The film capacitors A and B are obtained by forming metallikon electrodes as the external electrodes 4 on both end surfaces in the x direction of the obtained main body 3. For example, metal spraying, sputtering, plating or the like may be used for forming the external electrodes 4.

Then, an outer surface of the main body portion 3 on which the external electrode 4 is formed can be covered with an exterior member (not shown) as needed.

Examples of a material of the metal film 2 include a metal such as aluminum (Al) or zinc (Zn) and an alloy.

Further, as a material of the metallikon electrode, at least one metallic material selected from zinc, aluminum, copper and solder is suitable.

Figure 8:
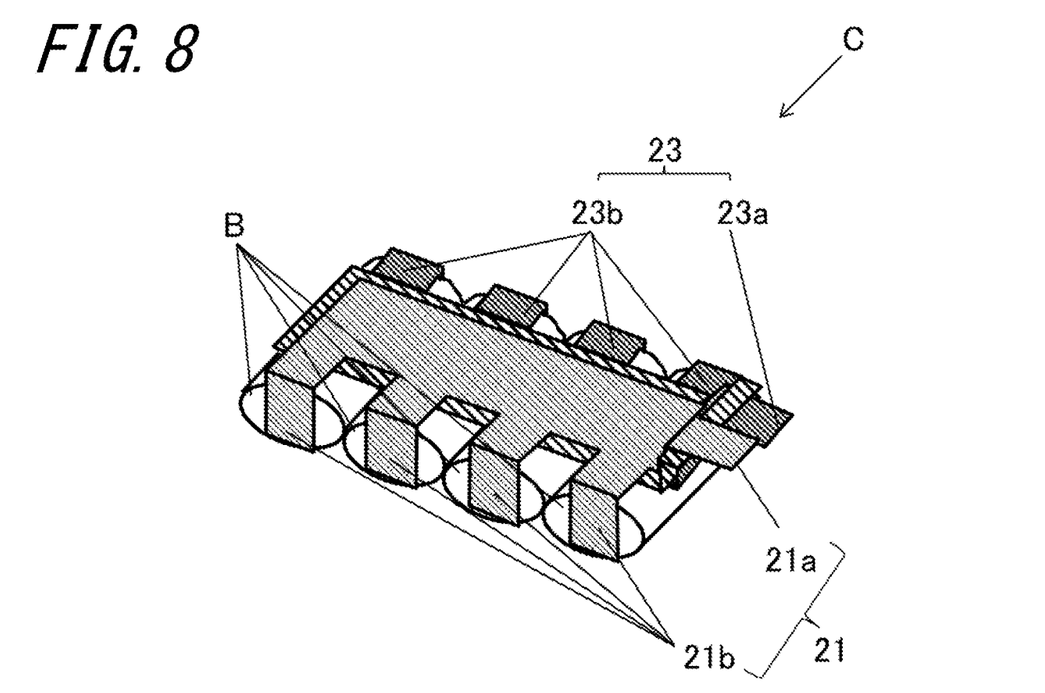
FIG. 8 is a perspective view schematically showing a structure of a combination type capacitor.

FIG. 8 is a perspective view schematically showing a structure of an embodiment of a combination type capacitor. In FIG. 8, in order to facilitate understanding of the structure, description of a case and a resin for molding is omitted. A combination type capacitor C of the present embodiment is configured such that a plurality of wound type film capacitors B are connected in parallel via a pair of bus bars 21 and 23. The bus bars 21 and 23 include external connection terminal portions 21a and 23a and lead terminal portions 21b and 23b which are connected to the external electrodes 4a and 4b of the film capacitor B, respectively.

When the above-described film capacitor B is applied to the combination type capacitor C, it is possible to obtain the combination type capacitor C which has an excellent self-recoverability and is reduced in capacitance reduction. Note that the laminated type film capacitor A may be used instead of the wound type film capacitor B.

The combination type capacitor C can be obtained by attaching the bus bars 21 and 23 to the external electrodes 4a and 4b which are formed on both ends of a main body portion 3, respectively, via a bonding material in a state where a plurality of (four in the present embodiment) film capacitors B are juxtaposed.

The film capacitor A, B and the combination type capacitor C may also be formed into a resin-molded (case-molded) capacitor by housing the film capacitor A, B or the combination type capacitor C in a case and then filling a space in the case with the resin.

The combination type capacitor C shown in FIG. 8 is the capacitor in which the film capacitors B are juxtaposed in a direction of a long diameter of a cross-section perpendicular to a winding axis thereof, however, as another structure, the film capacitors B may be stacked in a direction of a short diameter of the cross-section perpendicular to the winding axis thereof.

Figure 9:
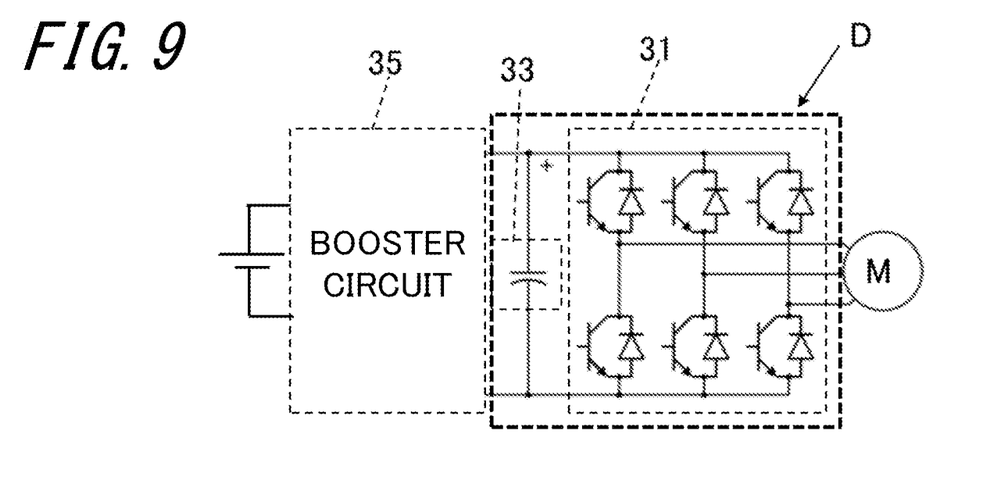
FIG. 9 is a schematic structural diagram for explaining a structure of an embodiment of an inverter.

FIG. 9 is a schematic structural diagram for explaining a structure of an embodiment of an inverter. FIG. 9 shows an example of an inverter D which creates an alternating current from a direct current. As shown in FIG. 9, the inverter D of the present embodiment includes a bridge circuit 31 including switching elements (for example, IGBT (Insulated Gate Bipolar Transistor)) and diodes, and a capacitance member 33 disposed between input terminals of the bridge circuit 31 for voltage stabilization. Here, the film capacitor A or B, or the combination type capacitor C described above is used as the capacitance member 33.

The inverter D is connected to a booster circuit 35 for boosting a voltage of a DC power supply. On the other hand, the bridge circuit 31 is connected to a motor generator (motor M) which is a drive source.

Figure 10:
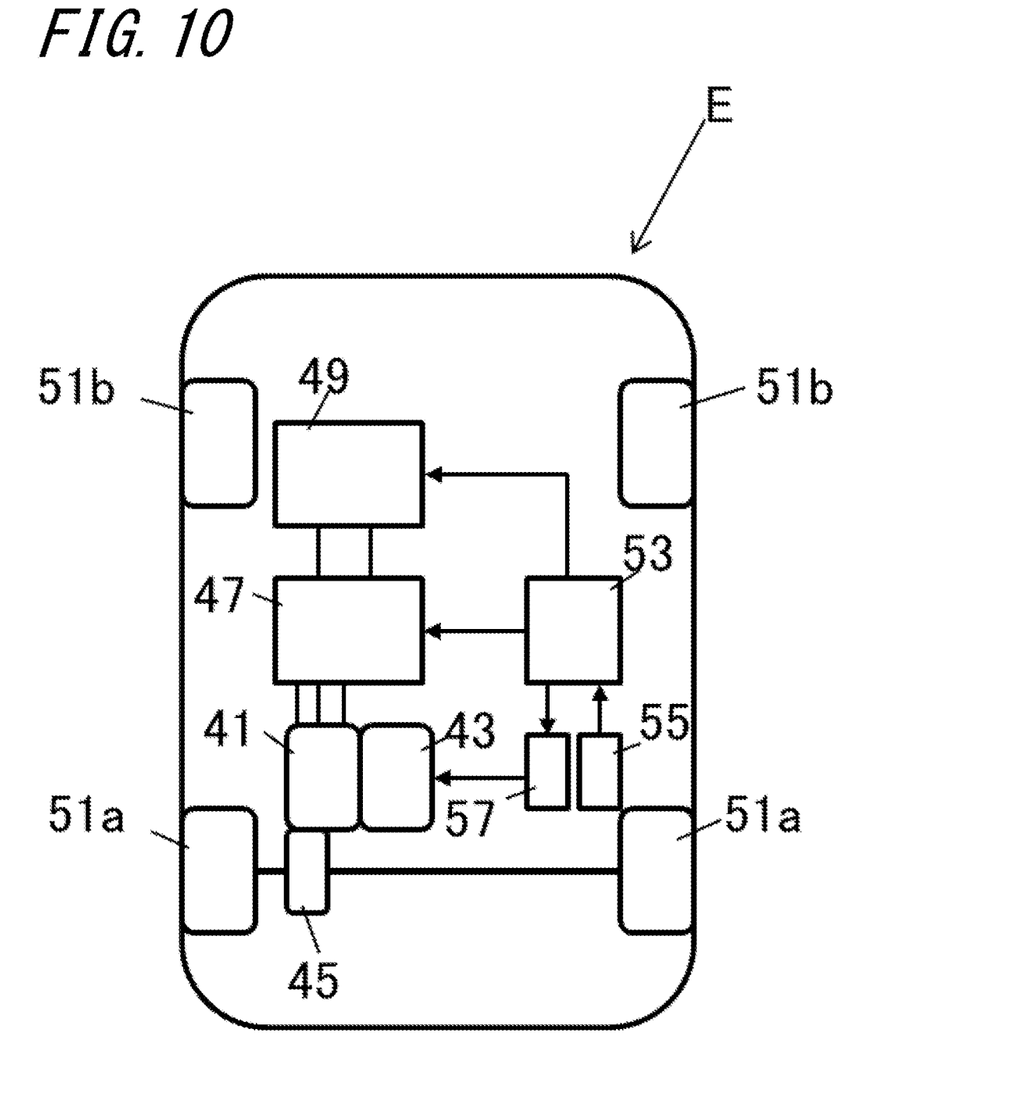
FIG. 10 is a schematic structural diagram showing an embodiment of an electric vehicle.

FIG. 10 is a schematic structural diagram showing an embodiment of an electric vehicle. FIG. 10 shows an example of a hybrid electric vehicle (HEV) serving as an electric vehicle E.

In FIG. 10, reference numeral 41 denotes a driving motor, reference numeral 43 denotes an engine, reference numeral 45 denotes a transmission, reference numeral 47 denotes an inverter, reference numeral 49 denotes a power supply (battery), and reference numerals 51a and 51b denote a front wheel and a rear wheel, respectively.

The electric vehicle E has a function of transmitting an output of the motor 41, the engine 43 or both of them serving as the drive source to the pair of left and right front wheels 51a via the transmission 45. The power supply 49 is connected to the motor 41 via the inverter 47.

The electric vehicle E shown in FIG. 10 is provided with a vehicle ECU 53 which performs comprehensive control of the entire electric vehicle E. Drive signals corresponding to the operation by a driver or the like from the electric vehicle E such as an ignition key 55, an accelerator pedal or a brake (not shown) are inputted to the vehicle ECU 53. The vehicle ECU 53 outputs instruction signals to the engine ECU 57, the power supply 49, and the inverter 47 serving as a load based on the drive signals. The engine ECU 57 controls a rotation speed of the engine 43 in response to the instruction signals to drive the electric vehicle E.

When the inverter D which uses the film capacitors A, B or the combination type capacitor C of the present embodiment as the capacitance member 33 is mounted on, for example, the electric vehicle E as shown in FIG. 10, since the film capacitors A, B or the combination type capacitor C has an excellent self-recoverability and is reduced in the capacitance reduction, it is possible to maintain electrostatic capacitance for a long period of time, thereby reducing switching noise generated in the inverter 47 or the like for a long time.

The inverter D of the present embodiment can be applied not only to the above-described hybrid electric vehicle (HEV) but also to various power conversion application products such as the electric vehicle (EV), a fuel cell vehicle, an electric bicycle, a generator, or a solar battery.

EXAMPLES

The dielectric film having an average thickness of 2.5 µm was prepared using polyarylate (U-100, manufactured by UNITIKA). The dielectric film was formed into a sheet shape by dissolving polyarylate in toluene and coating it on a base material of a polyethylene terephthalate (PET) using a coater. After forming, the sheet was heated at 130° C. to remove toluene and obtain the dielectric film.

The obtained dielectric film was peeled from the base material and slit-processed to have a width of 130 mm, and then an Al (aluminum) metal film with a width of 97 mm was formed on one main surface of the dielectric film. The Al metal film was formed by a vacuum vapor deposition method with a metal mask and an oil mask at a predetermined position. The vacuum vapor deposition was performed twice. The thickness of the metal film was determined by a scanning electron microscope (SEM) observation of a cross-section processed by ion milling. The sheet resistance of the metal film was evaluated by a four-terminal resistance measurement mode using a multimeter. As a result, the film thickness of the first portion and the second portion not having the oil mask was 15 nm, the sheet resistance thereof was 50 Ω/square, the film thickness of the third portion having the oil mask was 8 nm, and the sheet resistance thereof was 100 Ω/square.

A mesh pattern (see FIG. 4A) was formed in a region to be the second portion of the metal film using a green laser marker. As Example 4, a pattern in which the first portion and the second portion are directly adjacent to each other without the third portion was also produced.

Laser irradiation conditions were output 4 W, frequency 140 kHz, and scan speed 4 m/s. The mesh pattern of the second portion was a pattern including small regions of 2 mm×2 mm and a fuse portion of 0.4 mm width connecting the small regions.

The metal film-attached film of 130 mm width was further slit-processed to prepare the metal film-attached film of 50 mm width having the 1.5 mm insulation margin portion (metal film non-formed portion with exposed dielectric film). In the metal film-attached film of Example, as the width direction was a first direction (x direction), a first portion located at one end thereof, a second portion adjacent to an insulation margin portion located at the other end, and a third portion located between the first portion and the second portion were disposed. A length W3 of the third portion in the first direction (x direction) was set such that the ratio (W3/W0) to the width W0 of the metal film-attached film (dielectric film) is 0.5, 0.3 and 0.25. Hereinafter, a case where W3/W0 is 0.5 is referred to as Example 1, a case where W3/W0 is 0.3 is referred to as Example 2, and a case where W3/W0 is 0.25 is referred to as Example 3.

In the metal film-attached film of Example 4, the first portion located at one end in the first direction (x direction) and the second portion adjacent to the insulation margin portion located at the other end were disposed to be adjacent to each other at a center of the metal film-attached film.

In Examples 1-4, the width W1 of the first portion and the width W2 of the second portion were set to be equal.

A column formed of polypropylene (PP) having an outer diameter of 5 mm and a length of 50 mm was used as a winding core. A pair of metal film-attached films having a width of 50 mm was overlapped so that the metal films faced each other with the dielectric film interposed therebetween and wound around the winding core to produce a wound body. Note that the pair of metal film-attached films were wound in a state where they were offset from each other by 0.5 mm in the first direction (x direction) and the insulation margin portions were disposed on different sides in the first direction (x direction), respectively, to obtain the wound body (main body portion). The number of winding was 50 times.

An alloy of zinc and tin was thermally sprayed on opposing end surfaces of the wound body (main body portion) in which the metal film was exposed, to form the metallikon electrodes which are the external electrodes to obtain the film capacitor.

The electrostatic capacitance of the manufactured film capacitor was measured under conditions of 1 V AC and 1 kHz using an LCR meter. The electrostatic capacitance was 20 μF in all Examples 1-4.

A heat generation state and a capacitance reduction rate of the film capacitor were evaluated as follows. For the heat generation state, a signal obtained by amplifying a sinusoidal wave of 10 kHz outputted by a function generator to a current of 100 A by a bipolar power supply was applied to the film capacitor at an initial temperature of 105° C. After about 1 hour elapsed from the application of the signal, and a surface temperature was saturated, a temperature in the central portion in the axial direction (x direction) was measured and compared with the initial temperature (105° C.). As for the capacitance reduction rate, after a DC voltage of 1200 V was applied to the film capacitor at room temperature for 120 seconds using an insulation resistance meter, the electrostatic capacitance was measured under conditions of AC 1V and 1 kHz using an LCR meter and compared with the initial electrostatic capacitance (20 μF). Results are shown in Table 1.

TABLE 1

|           | W3/W0 | Temperature rise | Capacitance reduction rate |
|-----------|-------|------------------|----------------------------|
| Example 1 | 0.5   | 8° C.            | 12%                        |
| Example 2 | 0.3   | 10° C.           | 5%                         |
| Example 3 | 0.25  | 12° C.           | 8%                         |
| Example 4 | —     | 15° C.           | 15%                        |

Temperature rise from the initial temperature due to the application of the electric current was 15° C. in Example 4 not having the third portion, but it was 12° C. or less in Examples 1 to 3, and it was confirmed that the heat generation was suppressed by having the third portion. This is probably because the concentration of heat generation was suppressed without overlapping and concentrating the fuse portions by having the third portion in Examples 1 to 3.

The capacitance reduction rate after the application of the DC voltage was 15% in Example 4 not having the third portion, but it was 12% or less in Examples 1 to 3, and it was confirmed that the heat generation was suppressed by having the third portion.

REFERENCE SIGNS LIST

A, B: Film capacitor
C: Combination type capacitor
D: Inverter
E: Electric vehicle
1, 1a, 1b: Dielectric film
2, 2a, 2b: Metal film
21, 21a, 21b: First portion of metal film
2m, 2ma, 2mb: Second portion of metal film
2n, 2na, 2nb: Third portion of metal film
3: Main body portion
4, 4a, 4b: External electrode
5, 5a, 5b: Metal film-attached film
7m: Groove
8m: Fuse portion
21, 23: Bus bar
31: Bridge circuit
33: Capacitance member
35: Booster circuit
41: Motor
43: Engine
45: Transmission
47: Inverter
49: Power supply
51a: Front wheel
51b: Rear wheel
53: Vehicle ECU
55: Ignition key
57: Engine ECU

The invention claimed is:

1. A film capacitor, comprising:
a main body portion comprising a dielectric film and a metal film; and
external electrodes disposed at a pair of main body ends in a first direction of the main body portion, respectively,
the metal film comprising a first portion, connected to an external electrode of the external electrodes, which is disposed at one of the pair of main body ends, a second portion disposed at the other of the pair of main body ends, and a third portion disposed between the first portion and the second portion in the first direction,
a film thickness of the third portion being smaller than a film thickness of the second portion, and
a length of the first portion being longer than a length of the third portion in the first direction.

2. The film capacitor according to claim 1, wherein the metal film comprises a pair of metal films opposed to each other with the dielectric film interposed therebetween, and the pair of metal films are disposed so that at least a part of the third portion of one of the pair of metal films overlaps a part of the third portion of the other of the pair of metal films.

3. The film capacitor according to claim 1, wherein the second portion comprises a plurality of small regions which are separated by intermittent mesh-like grooves, and fuse portions connecting the small regions.

4. The film capacitor according to claim 1, wherein a ratio of W3 to W0 is 0.2 to 0.3, in which the W0 denotes a length in the first direction of the dielectric film, and W3 denotes a length in the first direction of the third portion.

5. A combination type capacitor, comprising:
a plurality of film capacitors; and
at least one bus bar connecting all of the plurality of film capacitors,
the plurality of film capacitors comprising the film capacitor according to claim 1.

6. An inverter, comprising:
a bridge circuit comprising switching elements and a capacitance member connected to the bridge circuit,
the capacitance member comprising the combination type capacitor according to claim 5.

7. An electric vehicle, comprising:
a power supply;
an inverter connected to the power supply;
a motor connected to the inverter; and
a wheel driven by the motor,
the inverter comprising the inverter according to claim 6.

8. An inverter, comprising:
a bridge circuit comprising switching elements and a capacitance member connected to the bridge circuit,
the capacitance member comprising the film capacitor according to claim 1.

9. An electric vehicle, comprising:
a power supply;
an inverter connected to the power supply;
a motor connected to the inverter; and
a wheel driven by the motor,
the inverter comprising the inverter according to claim 8.

10. The film capacitor according to claim 1, wherein a side of the first portion, which is not connected to the external electrode, is connected to a side of the third portion, and
an other side of the third portion is connected to a side of the second portion.

* * * * *